No. 636,843. Patented Nov. 14, 1899.
J. E. RAMSEY.
PLUMB LEVEL.
(Application filed May 4, 1899.)
(No Model.)
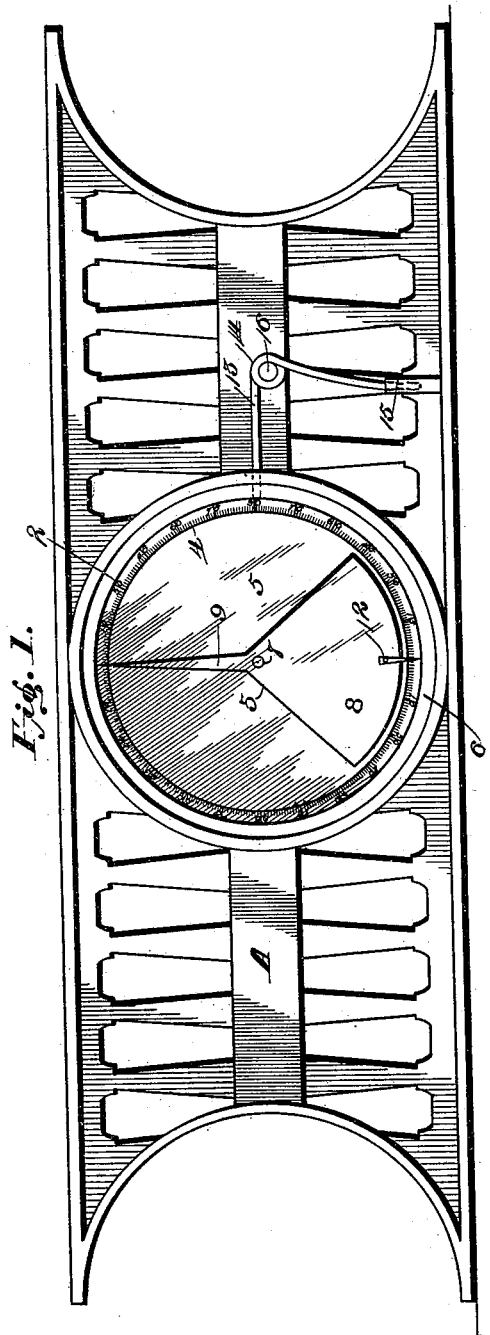
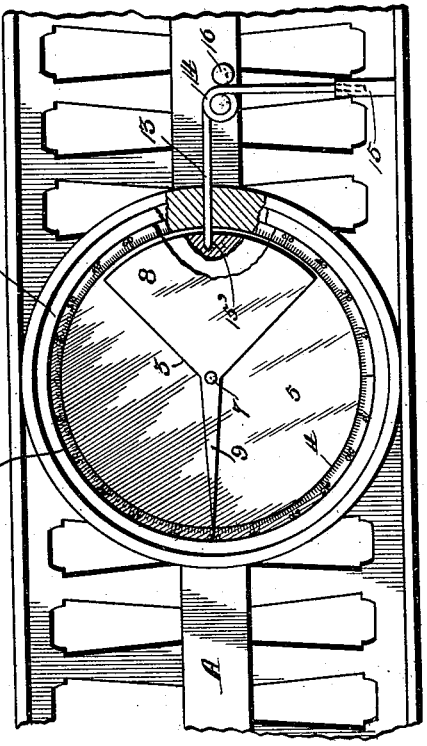
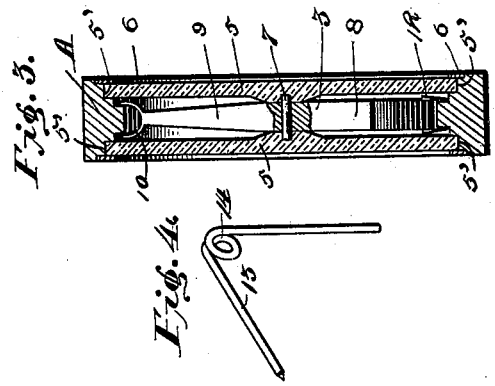
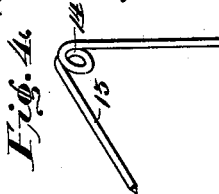
Witnesses
J. E. Ramsey Inventor
By his Attorneys,
THE NORRIS PETERS CO., PHOTO-LITHO., WASHINGTON, D. C.

UNITED STATES PATENT OFFICE.

JACOB E. RAMSEY, OF OAKESDALE, WASHINGTON, ASSIGNOR OF ONE-HALF TO JOHN WHEALDON, OF SAME PLACE.

PLUMB-LEVEL.

SPECIFICATION forming part of Letters Patent No. 636,843, dated November 14, 1899.

Application filed May 4, 1899. Serial No. 715,603. (No model.)

*To all whom it may concern:*

Be it known that I, JACOB E. RAMSEY, a citizen of the United States, residing at Oakesdale, in the county of Whitman and State of Washington, have invented a new and useful Level, of which the following is a specification.

This invention relates to levels of that class employing a weighted plumb bob or pendulum for obtaining readings; and the object of the invention is to provide a simple and effective appliance of this character involving means for locking the plumb-bob against oscillation or vibration when the instrument is not in use, thereby preventing unnecessary wear of the pintles or pivots of the bob upon their bearings in the lenses or crystals, and consequently prolonging the life and maintaining the accuracy of the level.

The device includes in its construction a stock which may be formed of any suitable material and which has an aperture, lenses fitted in said aperture, a graduated part, a plumb-bob having pivots or journals supported by bearings in the lenses, a spring-locking device for holding the plumb-bob against vibration when the level is not in use, and a device independent of the spring for holding it in its retracted position.

With these ends in view the invention consists in the novel combination of elements and in the construction and arrangement of parts, which will be hereinafter fully described and claimed.

To enable others to understand the invention, I have illustrated the preferred embodiment thereof in the accompanying drawings, forming a part of this specification, and in which—

Figure 1 is a side elevation of a level constructed in accordance with my invention and showing the spring-locker in its ineffective position. Fig. 2 is a similar view of a portion of the level, showing said spring-locker as holding the plumb-bob against vibration. Fig. 3 is a transverse central section, and Fig. 4 is a detail perspective view of the spring-locker.

Like characters denote like and corresponding parts in each of the several figures of the drawings.

The device includes in its construction a stock, as A, generally formed in one piece by casting, and it has an aperture 2 intermediate of its ends within which the plumb-bob 3 is centrally disposed. The graduated part 4 extends inward from the wall of the aperture and it is of annular form and provided upon its opposite faces with the graduations familiar in this class of instruments. The annular channels 5' are formed in the stock within the aperture 2 at opposite sides of the graduated portion, and the lenses 5 fit against the inner walls of these channels and are held thereagainst by metal rings, as 6, secured to the opposite faces of the stock and sunk in depressions therein, so that the opposite faces of the stock and of the two rings will be flush.

The lenses 5 have bearings at their center to receive the journal 7, extending outwardly from the plumb-bob 3, and which is sustained for oscillation midway between said lenses.

The plumb-bob includes a segmental centralizing-weight 8 and an arm 9, extending therefrom, said arm being bifurcated, as at 10, at its upper end and the branches of the bifurcation being pointed and constituting index-fingers and lying across the outer faces of the graduated section 4. A second pair of pointers is shown at 12, they being secured to the weight 8 and being located upon opposite sides of the graduated portion 4 at a point in direct line with the bifurcation 10, and from this description it will be evident that the instrument can be read at both sides of the axis of the plumb-bob and also from opposite sides of the level. The two pointers 12 can be secured in any convenient manner to the weight 8.

When the instrument is not in use, a locker is brought into play for holding the plumb-bob in its ineffective position, as represented in Fig. 2, and the locker is denoted by 13, and it consists of a substantially L-shaped spring having the coil or eye 14 at its elbow or bend, and one end of the spring is secured in a socket formed in the lug 15 upon the stock A. The horizontal portion of the spring-locker is adapted to extend into the aperture 2, as indicated in Fig. 1, and to engage in the hole 15', formed in the curved face of the weight 8, and when the two parts are in engagement, as represented, the plumb-bob will be held against motion.

The spring 13 is held in engagement or locking relation with the plumb-bob by means of the knob 16 on the stock and which is adapted to engage the spring adjacent to the eye 14, as represented in Fig. 1. To release the plumb-bob, so that the level can be used, the horizontal or working arm thereof will be drawn back across the wall of the aperture, and the eye 14 will be placed over the knob or projection 16, thereby holding the spring in its ineffective position. Therefore a single device is employed for holding the plumb-bob-locking device in its two extreme positions.

Changes in the form, proportion, size, and the minor details of construction within the scope of the appended claims may be resorted to without departing from the spirit or sacrificing any of the advantages of this invention.

Having thus described the invention, what I claim is—

1. In a level, the combination with a stock having an aperture therein, lenses fitted in said aperture, and a graduated device in the aperture, of a plumb-bob supported for oscillation between the lenses, and a yielding angular locking device exteriorly exposed on the stock and adapted to be held at its angular portion in locked position on the stock, one member of the said locking device being rigidly connected to the stock and the opposite member free to bear against the edge of a portion of the plumb-bob.

2. In a level, the combination with a stock having an aperture, lenses fitted in said aperture, a graduated device within the aperture, a spring adapted to engage the plumb-bob to hold the same against vibration and having a coil, and a knob adapted to engage the spring to hold the same in its working position and adapted also to receive said coil, substantially as described.

3. In a level, the combination with a stock having an aperture, of a plumb-bob located in said aperture, an L-shaped spring having a coil at its bend and one arm of which is adapted to engage in an opening in the plumb-bob, a lug having a socket to receive one end of the spring, and a knob engaging said spring and adapted to receive said coil, substantially as described.

In testimony that I claim the foregoing as my own I have hereto affixed my signature in the presence of two witnesses.

JACOB E. RAMSEY.

Witnesses:
R. H. HUTCHINSON,
S. H. THOMPSON.